(12) United States Patent
Fakhrai

(10) Patent No.: US 7,511,387 B2
(45) Date of Patent: Mar. 31, 2009

(54) METHOD AND APPARATUS FOR PRODUCING ENERGY USING AIR PRESSURE DIFFERENTIAL

(75) Inventor: Mehdi Fakhrai, 3457 Alana Dr., Sherman Oaks, CA (US) 91403

(73) Assignee: Mehdi Fakhrai, Sherman Oaks, CA (US)

( * ) Notice: Subject to any disclaimer, the term of this patent is extended or adjusted under 35 U.S.C. 154(b) by 75 days.

(21) Appl. No.: 10/703,401

(22) Filed: Oct. 4, 2003

(65) Prior Publication Data

US 2005/0161951 A1    Jul. 28, 2005

(51) Int. Cl.
*F03B 13/00* (2006.01)
*H02P 9/04* (2006.01)
*F03D 9/00* (2006.01)
*B60L 1/02* (2006.01)
*F01K 15/00* (2006.01)
*F01K 17/02* (2006.01)
*F02C 6/00* (2006.01)
*F02C 6/18* (2006.01)

(52) U.S. Cl. .............................. 290/54; 290/2; 290/55; 290/43

(58) Field of Classification Search .............. 290/2, 290/54–55
See application file for complete search history.

(56) References Cited

U.S. PATENT DOCUMENTS

| | | | | | |
|---|---|---|---|---|---|
| 1,112,203 | A | * | 9/1914 | Fandrey | 415/4.4 |
| 3,846,519 | A | * | 11/1974 | Spangemacher | 261/151 |
| 3,936,652 | A | * | 2/1976 | Levine | 290/2 |
| 3,979,597 | A | * | 9/1976 | Drucker | 290/55 |
| 4,016,725 | A | * | 4/1977 | Fiss | 60/690 |
| 4,031,173 | A | * | 6/1977 | Rogers | 261/24 |
| 4,036,916 | A | * | 7/1977 | Agsten | 261/109 |
| 4,070,131 | A | * | 1/1978 | Yen | 415/4.4 |
| 4,095,118 | A | * | 6/1978 | Rathbun | 290/2 |
| 4,157,368 | A | * | 6/1979 | Fernandes | 261/155 |
| 4,421,452 | A | * | 12/1983 | Rougemont | 415/4.2 |
| 4,433,544 | A | * | 2/1984 | Wells et al. | 60/641.12 |
| 4,452,046 | A | * | 6/1984 | Valentin | 60/641.11 |
| 4,452,562 | A | * | 6/1984 | Hsu | 415/208.1 |
| 4,499,034 | A | * | 2/1985 | McAllister, Jr. | 261/109 |
| 4,508,973 | A | * | 4/1985 | Payne | 290/55 |
| 4,779,006 | A | * | 10/1988 | Wortham | 290/55 |
| 5,300,817 | A | * | 4/1994 | Baird | 290/55 |
| 5,381,048 | A | * | 1/1995 | Baird | 290/55 |
| 5,395,598 | A | * | 3/1995 | Prueitt | 422/168 |
| 5,478,197 | A | * | 12/1995 | Schatz et al. | 415/2.1 |
| 5,480,594 | A | * | 1/1996 | Wilkerson et al. | 261/109 |
| 5,694,774 | A | * | 12/1997 | Drucker | 60/641.11 |
| 5,983,634 | A | * | 11/1999 | Drucker | 60/398 |
| 6,016,015 | A | * | 1/2000 | Willard, Jr. | 290/55 |
| 6,201,313 | B1 | * | 3/2001 | Nakamats | 290/54 |
| 6,215,199 | B1 | * | 4/2001 | Lysenko et al. | 290/44 |
| 6,510,687 | B1 | * | 1/2003 | Zaslavsky et al. | 60/398 |

(Continued)

*Primary Examiner*—Julio C Gonzalez
*Assistant Examiner*—Pedro J Cuevas
(74) *Attorney, Agent, or Firm*—Mehdi Fakhrai

(57) ABSTRACT

An apparatus for generating and a method for creating the apparatus are disclosed. In an embodiment, the apparatus comprises an element (e.g., a mountain) having a conduit formed therein. The conduit has an inlet and an outlet, with the inlet disposed at a first elevation and the outlet disposed at a second elevation higher than the first elevation. A generator is disposed in the conduit such that fluid moving through the conduit motivates the generator.

15 Claims, 6 Drawing Sheets

U.S. PATENT DOCUMENTS

| | | | |
|---|---|---|---|
| 6,518,680 B2 * | 2/2003 | McDavid, Jr. ................. | 290/54 |
| 6,532,740 B1 * | 3/2003 | Sullivan .................. | 60/641.11 |
| 6,590,300 B1 * | 7/2003 | Santiago ...................... | 290/55 |
| 6,647,717 B2 * | 11/2003 | Zaslavsky et al. ............. | 60/398 |
| 6,703,720 B1 * | 3/2004 | Ferraro ........................ | 290/55 |
| 6,717,285 B2 * | 4/2004 | Ferraro ........................ | 290/55 |
| 6,943,461 B2 * | 9/2005 | Kaploun ...................... | 290/43 |
| 7,026,723 B2 * | 4/2006 | Moreno ....................... | 290/55 |
| 7,086,823 B2 * | 8/2006 | Michaud ..................... | 415/4.2 |
| 7,112,893 B1 * | 9/2006 | Villanueva ................... | 290/55 |
| 7,154,190 B2 * | 12/2006 | Kaploun ...................... | 290/43 |
| 7,208,846 B2 * | 4/2007 | Liang .......................... | 290/1 R |
| 7,400,057 B2 * | 7/2008 | Sureshan ..................... | 290/55 |
| 2002/0148222 A1 * | 10/2002 | Zaslavsky et al. ............. | 60/398 |
| 2002/0162329 A1 * | 11/2002 | Dunn ......................... | 60/641.8 |
| 2004/0041400 A1 * | 3/2004 | Mamo ......................... | 290/1 R |
| 2006/0226657 A1 * | 10/2006 | Liang .......................... | 290/44 |

* cited by examiner

METHOD AND APPARATUS FOR PRODUCING ENERGY USING AIR PRESSURE DIFFERENTIAL

FIELD

The embodiments disclosed herein relate generally to energy production, and more particularly to using pressure differential of a fluid to produce energy.

BACKGROUND

Wind is caused by air moving from an area of high pressure to an area of low pressure. The naturally occurring flow of air has been harnessed for centuries in order to accomplish various useful functions. For example, windmills were originally used to accomplish mechanical functions such as grinding and pumping water. Eventually windmills were used to generate electricity by coupling a generator to a rotating portion of the windmill.

In order to increase the amount of energy produced, wind-harnessing devices are placed in areas where the wind blows the strongest and the most frequently. However, one drawback of positioning wind-harnessing devices along the surface of the earth is that in most areas the wind does not always blow with enough force to generate electricity. This is due to the fact that the pressure differential along the surface of the earth is always changing. Thus, a wind-harnessing device in a fixed position on the surface of the earth is only effective when the pressure conditions along the surface of the earth are suitable to generate a flow of wind that can motivate a generator.

SUMMARY

An apparatus for generating energy and a method for creating the apparatus are disclosed. In an embodiment, the apparatus comprises an element (e.g., a mountain) having a conduit formed therein. The conduit has an inlet and an outlet, with the inlet disposed at a first elevation and the outlet is disposed at a second elevation higher than the first elevation. A generator is disposed in the conduit such that fluid moving through the conduit motivates the generator.

In one embodiment, a radiator is disposed in the conduit so that the fluid flow can cool going over radiator to change the velocity of the fluid flow (air) for control of speed of air through the system (turbine).

In various embodiments, the inlet of the conduit has a larger cross-sectional area than the cross-sectional area of the outlet. In an alternative embodiment, multiple conduit branches, each having a separate inlet, converge to feed the outlet. Larger the inflow, higher the energy generated, higher the level of outlet from inlet, higher the difference of the pressure, and higher the energy being generated.

DESCRIPTION OF THE DRAWINGS

Various embodiments are illustrated by way of example and not by way of limitation in the figures of the accompanying drawings in which like references indicate similar elements. It should be noted that references to "an," "one," or "various" embodiments in this disclosure are not necessarily to the same embodiment, and such references mean at least one.

DETAILED DESCRIPTION

In the following description, for the purposes of expedition, numerous specific details are set forth in order to provide a thorough understanding of the various embodiments. It will be apparent to one skilled in the art that the embodiments may be practiced without some of these specific details.

The following description and the accompanying drawings provide examples for the purposes of illustration. However, these examples should not be construed in a limiting sense as they are not intended to provide an exhaustive list of all possible implementations. In other instances, certain structures and devices are omitted or simplified in order to avoid obscuring the details of the various embodiments.

Figure 1:
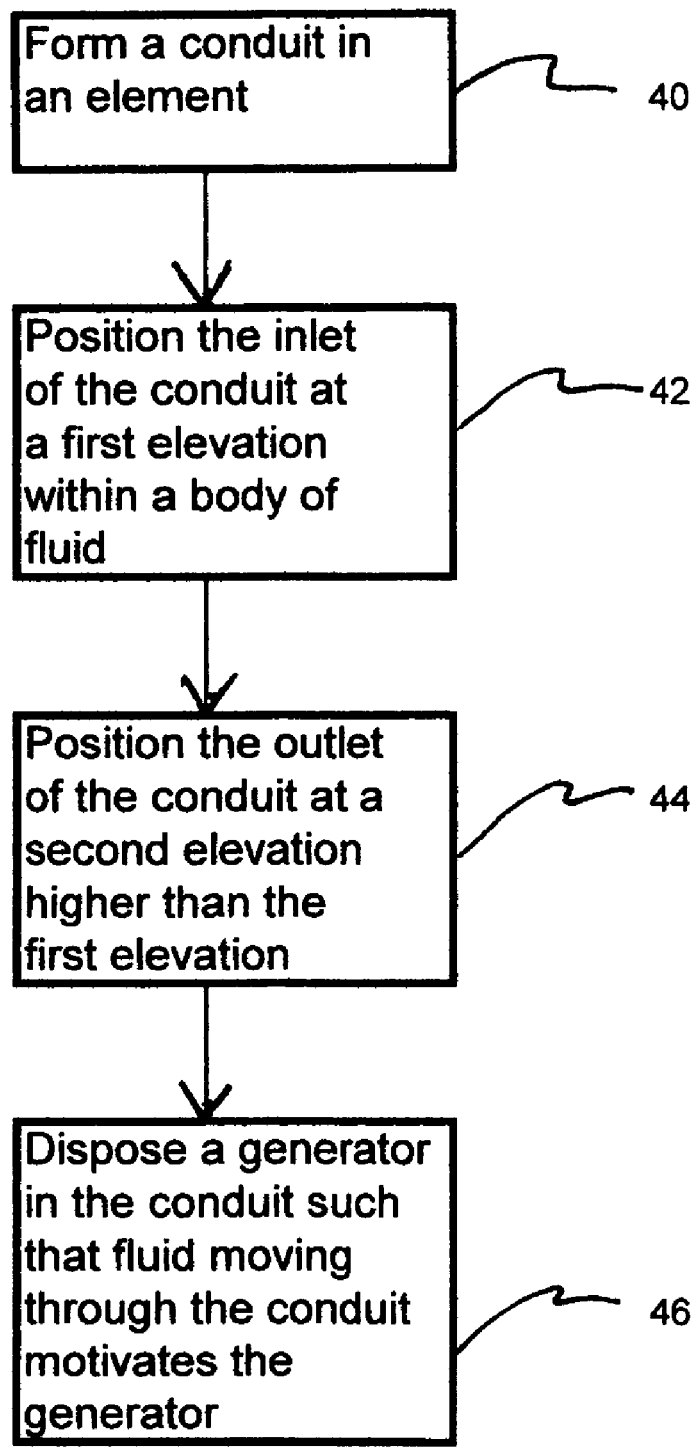
FIG. 1 is a flow chart showing one method of creating an apparatus that can generate energy.

Referring now to FIG. 1, flow chart is shown that details a method of creating an apparatus capable of generating energy. At block 40, a conduit is formed in an element. The element could be, for example, a man-made structure, a portion of the earth, or the inlet is vegetation on the earth (e.g. a mountain).

The conduit has an inlet and an outlet. At block 42, the inlet is positioned at a first elevation within a body of a fluid. The body of fluid is at least one of a gas. In some embodiments, the body of fluid is simply air from the atmosphere.

At block 44, the outlet of the conduit is positioned, for example, at a second elevation that is higher than the first elevation. The reasoning for positioning the outlet at a higher elevation is that the pressure at the higher elevation is lower than the pressure at the first elevation, which causes fluid to flow from the inlet to the outlet. However, the inlet and outlet may be positioned in any manner to take advantage of a pressure differential that yields a flow of fluid from the inlet to the outlet.

A generator is disposed in the conduit, at block 46, such that fluid moving through the conduit motivates the generator. Although a generator is used in this embodiment to generate energy or electricity, any device could be disposed in the fluid path to take advantage (e.g., mechanically or electrically) of the moving fluid.

Figure 2:
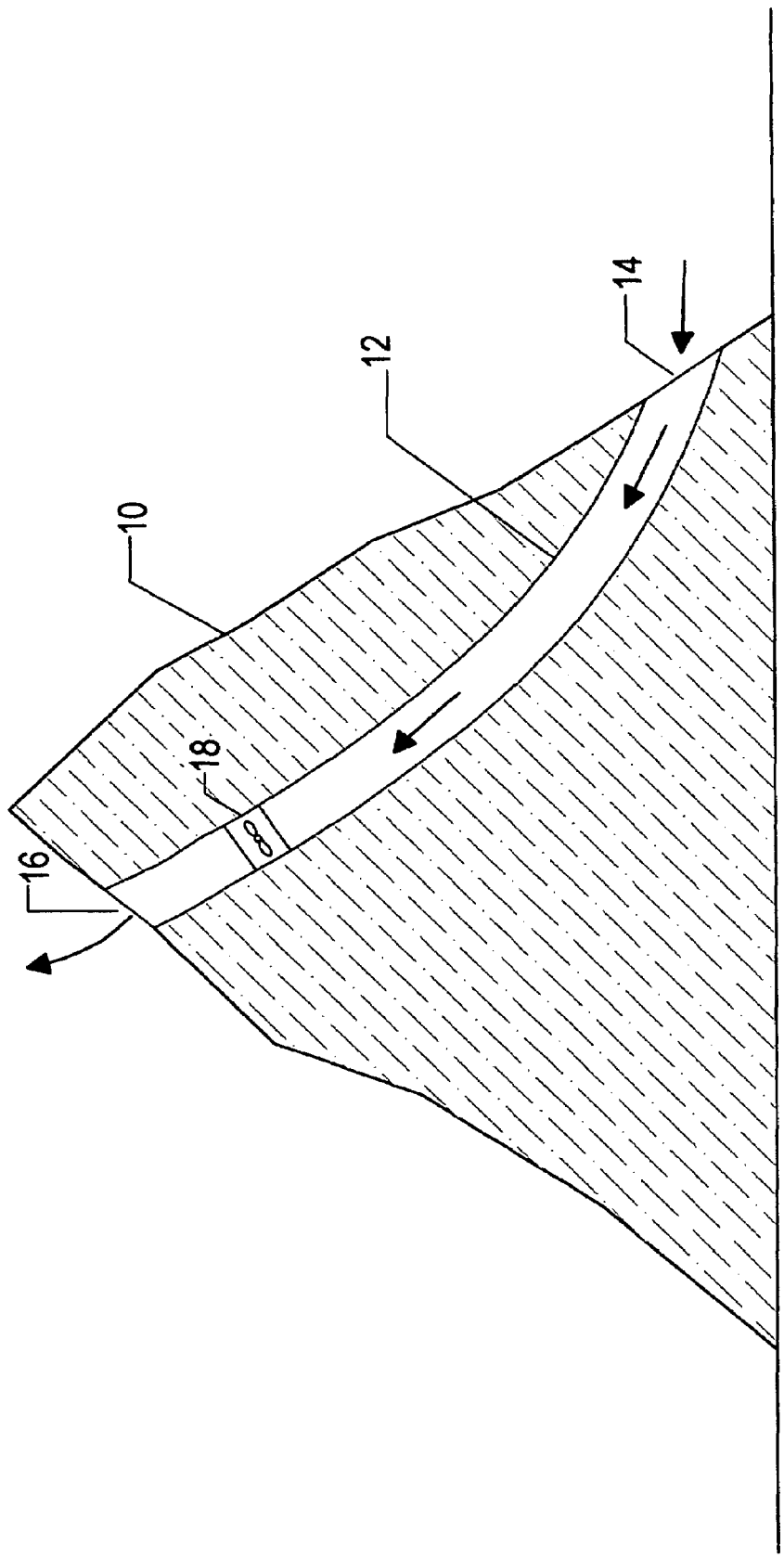
FIG. 2 is an embodiment of and apparatus capable of generating energy wherein the inlet is on one side of a mountain and the outlet is on another side of the mountain.

FIG. 2 shows an example of a device created according to the method described in regards to FIG. 1. Element 10 is a mountain in this embodiment. Conduit 12 is formed in element 10 and has inlet 14 disposed at a first elevation on one side of element 10 and outlet 16 disposed at a second elevation on a different side of element 10. The second elevation is higher than the first elevation, air moves from inlet 14 to outlet 16 due to at least one of a pressure differential.

Generator 18 is disposed in conduit 12 such that the flow of air through conduit 12, indicated by arrows in FIG. 2, motivates generator 18. Although generator is disposed near outlet 16 in FIG. 2, generator 18 may be disposed at any position within conduit 12, including near inlet 14.

Figure 3:
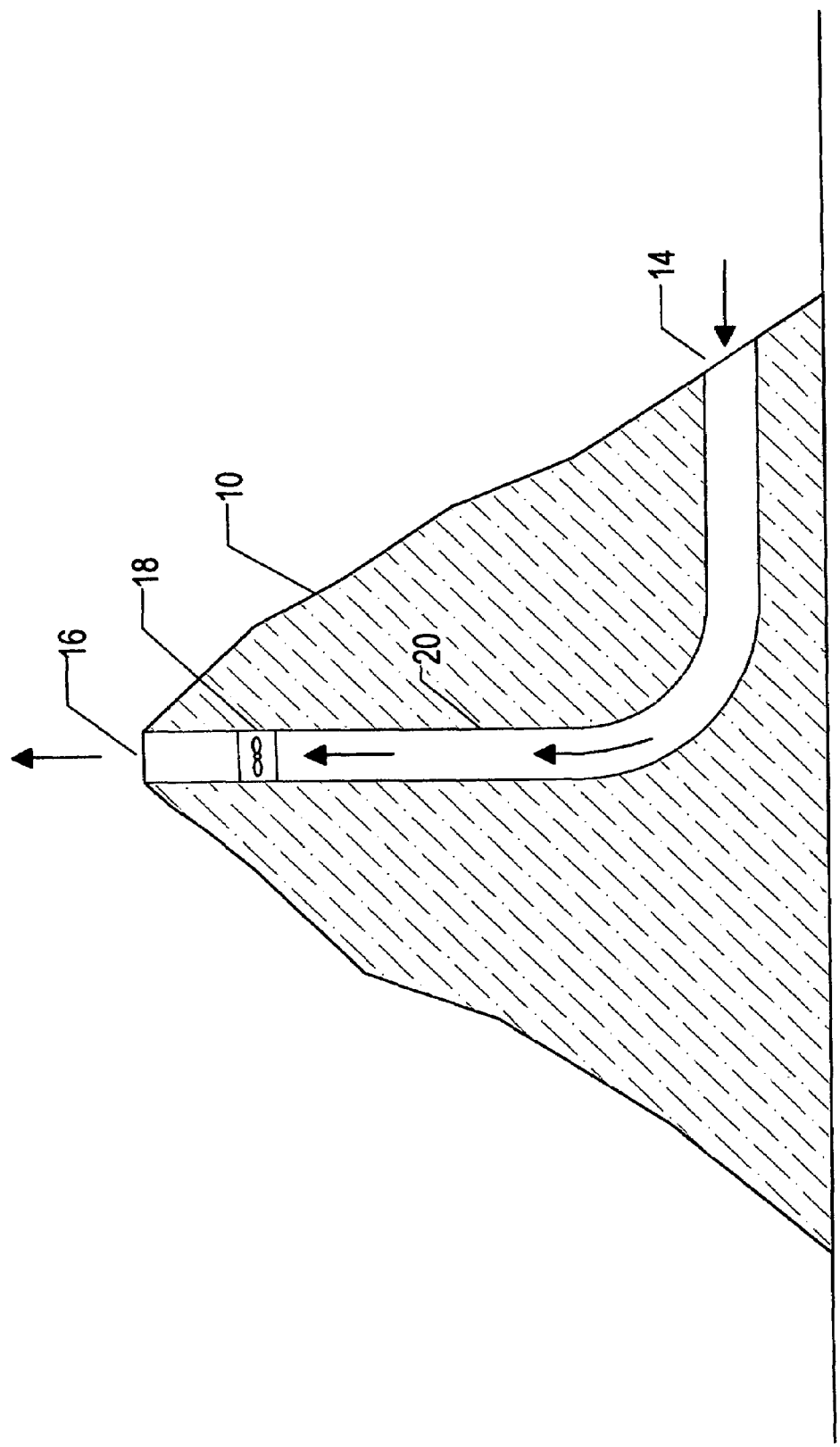
FIG. 3 is an embodiment of an apparatus capable of generating energy wherein the inlet is on one side of a mountain and the outlet is at the top of the mountain.

FIG. 3, shows an alternative embodiment wherein conduit 20 has inlet 14 positioned at a first elevation on one side of element 10 and outlet 16 positioned at a second elevation at the top of element 10.

Figure 4:
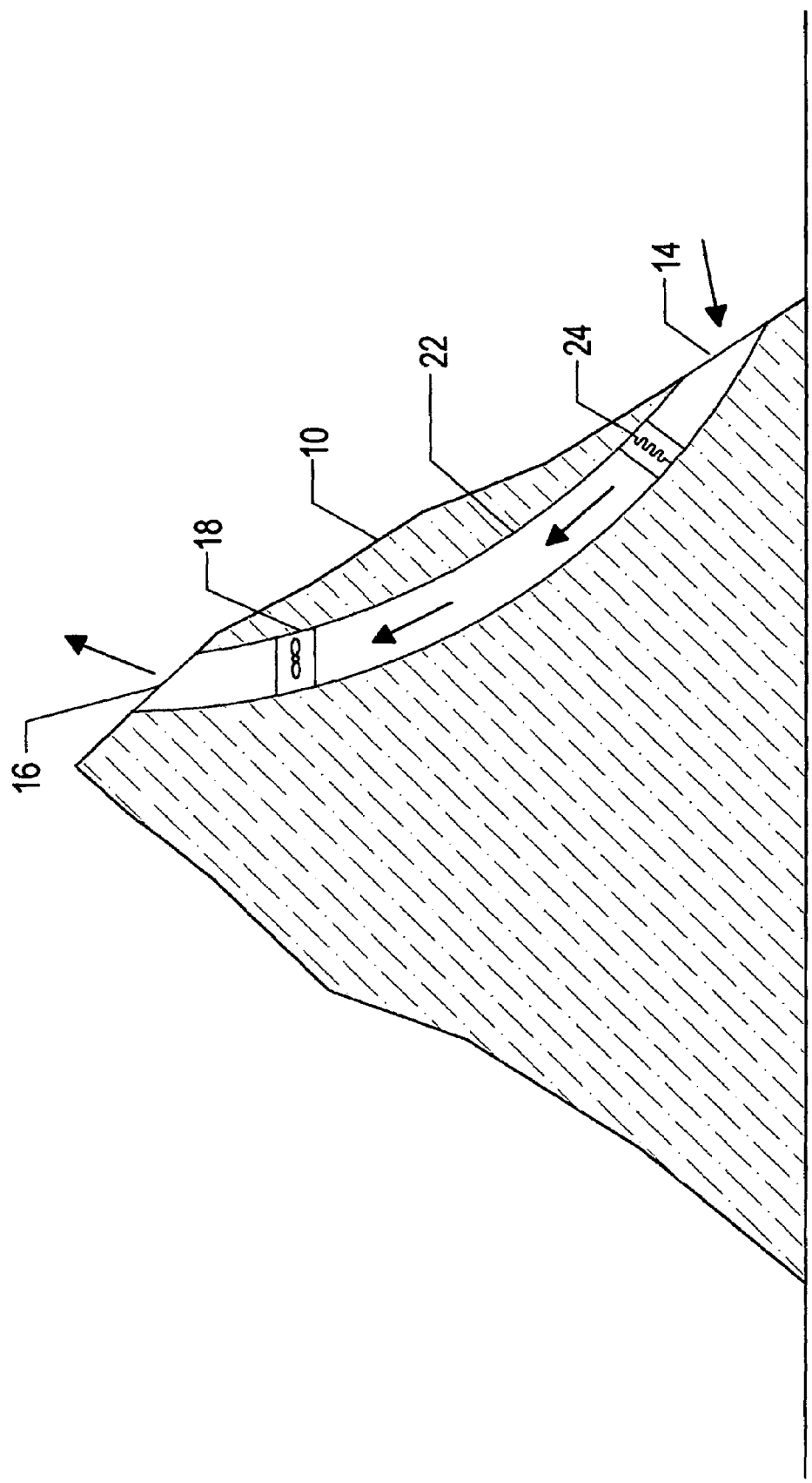
FIG. 4 is an embodiment of an apparatus capable of generating energy wherein the inlet is on one side of a mountain and the outlet is on the same side of the mountain as the inlet.

FIG. 4, shows a further embodiment wherein conduit 22 has inlet 14 positioned at a first elevation on one side of element 10 and outlet 16 positioned at a second elevation on the same side of element 10 as inlet 14. FIG. 4 also has radiator 24 is disposed near inlet 14, radiator 24 may be disposed anywhere within conduit 22. Moreover, radiator 24 may be used in conjunction with any of the other embodiments disclosed herein.

Figure 5:
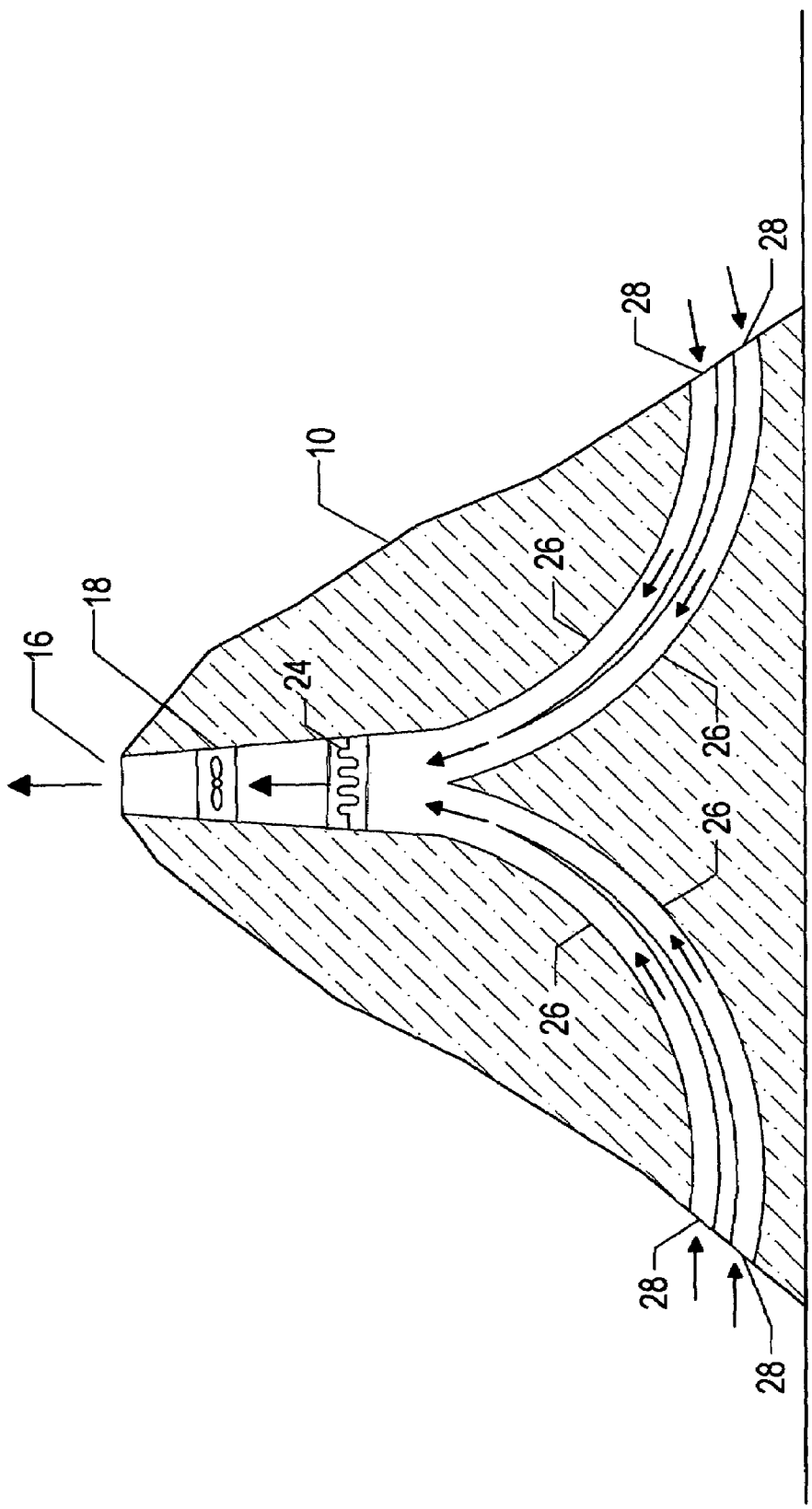
FIG. 5 is an embodiment of an apparatus capable of generating energy, the apparatus having multiple inlets and a single outlet.

FIG. 5 shows and embodiment having a plurality of conduit branches 26. Conduit branches 26 converge to feed outlet 16. Each conduit branch 26 has a separate inlet 28. Inlets 28 are disposed at elevations lower than the elevation of outlet 16. Such a configuration increases the volume of fluid flow to motivate generator 18.

Radiator 24 is disposed where conduit branches 26 converge. Radiator 24 is, for example, at a temperature lower than that of the fluid flowing through conduit branches. Thus, the fluid flow cools by transferring heat to radiator 24, which decreases the velocity of the fluid flow. Although radiator 24 is shown in the area where conduit branches 26 converge, radiator 24 may be disposed anywhere within conduit branches 26 of FIG. 5 or at any point within the other embodiments disclosed herein.

Figure 6:
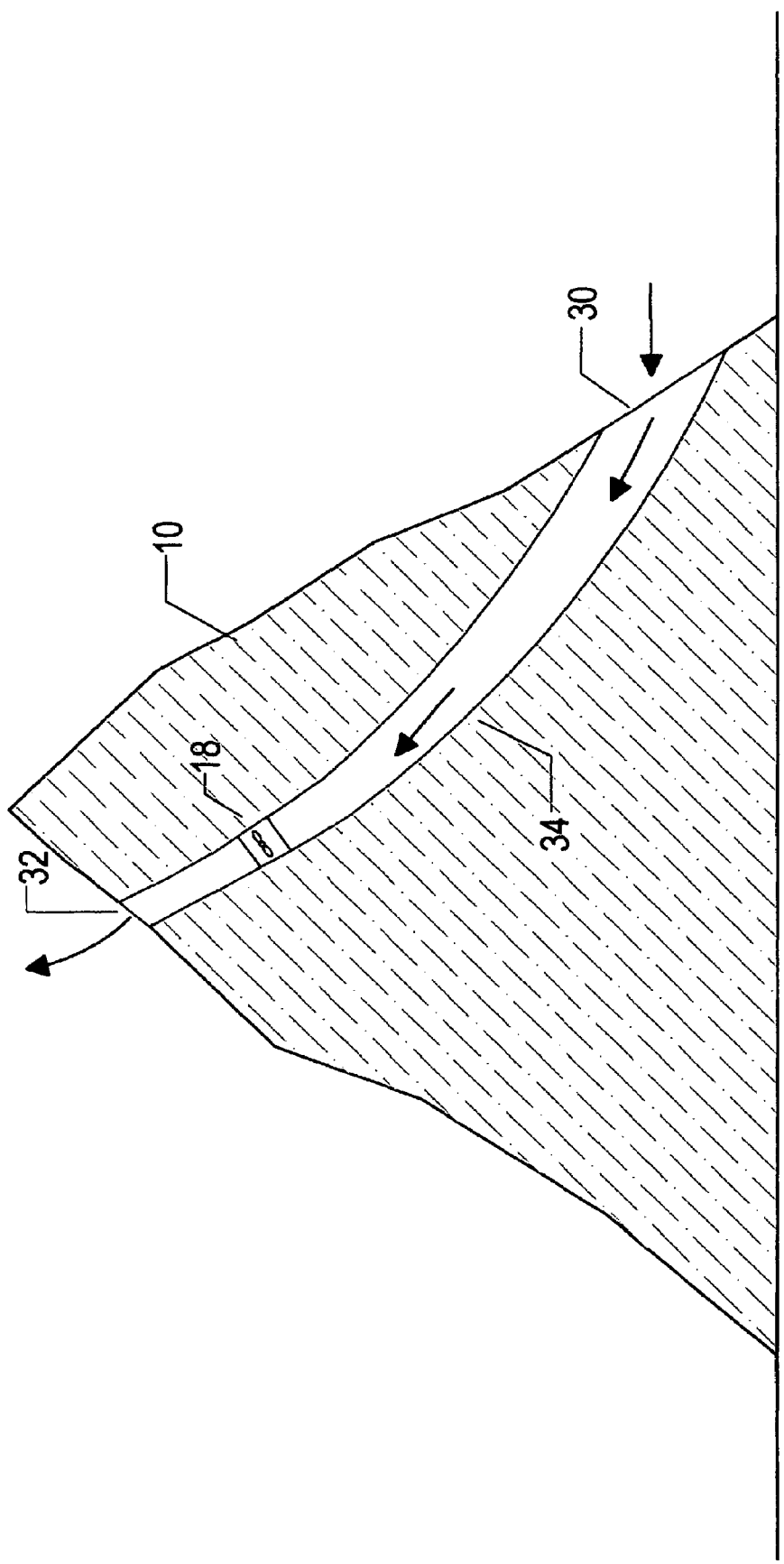
FIG. 6 is and embodiment of an apparatus capable of generating energy wherein the outlet has a smaller cross-sectional area than the cross-sectional area of the inlet.

FIG. 6 shows an embodiment wherein inlet 30 of conduit 34 has a larger cross-sectional area than the cross-sectional area of outlet 32. The embodiments shown in FIGS. 2-5 may have inlets and outlets with the same cross-sectional area or may have a difference in cross-sectional area, as shown in FIG. 6. Despite the relative cross-sectional areas of the inlet and the outlet, the inlets and outlets of the various embodiments may have any shape that allows fluid flow through the conduit to motivate generator 18.

It is to be understood that even though numerous characteristics and advantages of various embodiments have been set forth in the foregoing description, together with details of structure and function of the various embodiments, this disclosure is illustrative only. Changes may be made in detail, especially matters of structure and management of parts, without departing from the scope of the various embodiments as expressed by the broad general meaning of the terms of the appended claims.

In summary this invention uses the column of atmospheric air and its pressure difference that is present between surface of the earth and higher elevation (e.g. mountain) by channeling that through conduit (e.g. tunnel in the mountain) to turn a turbine or similar devices to create energy.

I claim:

1. A method comprising:
forming a conduit in an element, wherein the conduit has an inlet and an outlet; positioning the inlet at a first elevation within a body of fluid (air or other gases); positioning the outlet at a second elevation that is higher than the first elevation; and disposing a generator in the conduit such that fluid moving through the conduit motivates the generator by the force of only the atmospheric pressure difference between the first elevation and the second elevation;
disposing a radiator in the conduit to modify the speed of the fluid (air, other gases) for control and regulation;
reducing the temperature of fluid by transferring heat to the radiator with the flow of fluid (air, other gases) moving through the conduit over the radiator to modify the speed of the fluid (air, other gases) for control and regulation.

2. The method of claim 1, further comprising exchanging heat of the fluid (air, other gases) in the conduit to decrease the velocity of the fluid (air, other gases) moving in the conduit to modify the speed of the fluid (air, other gases) for control and regulation.

3. The method of claim 1, further comprising:
forming the inlet and the outlet such that the inlet has a larger cross-sectional area than a cross-sectional area of the outlet between the atmospheric pressure of the inlet and outlet to increase the pressure difference.

4. The method of claim 1, further comprising:
forming multiple inlets to feed multiple conduit branches that converge to feed the outlet to increase the pressure difference.

5. An apparatus comprising:
an element having a conduit formed therein, the conduit having an inlet and an outlet, wherein the inlet is disposed at a first elevation within a body of fluid (air, other gases) and the outlet is disposed at a second elevation that is higher than the first elevation;
a generator disposed in the conduit such that fluid (air, other gases) moving through the conduit motivates the generator, and
a radiator disposed in the conduit to reduce the temperature of fluid (air, other gases) moving through the conduit for control and regulation.

6. The apparatus of claim 5, wherein the first elevation has a higher pressure than a pressure of the second elevation.

7. The apparatus of claim 5, wherein the first elevation has a higher temperature than a temperature of the second elevation.

8. The apparatus of claim 5, wherein the element comprises at least one of earth and a man-made structure.

9. The apparatus of claim 5, wherein the body of fluid comprises at least one of air and other gases.

10. The apparatus of claim 5, wherein the inlet has a larger cross-sectional area than a cross-sectional area of the outlet to augment the pressure difference between inlet and outlet.

11. The apparatus of claim 5, further comprising a plurality of conduit branches, each having a corresponding inlet that converges to feed the outlet to augment the pressure difference between inlet and outlet.

12. The apparatus of claim 5, further comprising a second conduit to provide a second flow of fluid to overcome an inertial resistance to movement of the generator.

13. The apparatus of claim 11, wherein
the plurality of conduit branches converge to feed a single conduit segment extending to the outlet, and
the radiator is disposed in the single conduit segment.

14. A method comprising:
forming a conduit in an element, wherein the conduit has an inlet and an outlet;
positioning the inlet at a first elevation within a body of fluid (air or other gases); positioning the outlet at a second elevation that is higher than the first elevation; and disposing a generator in the conduit such that fluid moving through the conduit motivates the generator;
disposing a radiator in the conduit to modify the speed of the fluid (air, other gases) for control and regulation;
reducing the temperature of fluid by transferring heat to the radiator with the flow of fluid (air, other gases) moving through the conduit over the radiator to modify the speed of the fluid (air, other gases) for control and regulation.

15. The method of claim 14, further comprising exchanging heat of the fluid (air, other gases) in the conduit to decrease the velocity of the fluid (air, other gases) moving in the conduit to modify the speed of the fluid (air, other gases) for control and regulation.

* * * * *